Dec. 16, 1947.  S. A. PECK  2,432,796
EXAMINING DEVICE
Filed Aug. 23, 1944

INVENTOR.
SAMUEL A. PECK
BY George M Soule
ATTORNEY

Patented Dec. 16, 1947

2,432,796

UNITED STATES PATENT OFFICE 2,432,796

EXAMINING DEVICE

Samuel A. Peck, Cleveland Heights, Ohio, assignor to The Trundle Engineering Company, Cleveland, Ohio, a corporation of Ohio Application August 23, 1944, Serial No. 550,769

4 Claims. (Cl. 35—48)

This invention relates to a device for examining persons such as applicants for employment or students and the principal object is to provide a very simple device for that purpose which will enable questions to be readily answered by the persons examined without recourse to writing, without requiring supervision or the attention of an instructor or examiner and further which will enable quick and accurate checking of the correctness or character of the responses of the person examined.

A further object is to provide a device of the character indicated above having relatively few parts and so arranged that the portion of the device used for checking of the responses can be easily concealed from the view of the person examined and readily applied for checking purposes.

Another object is to provide a device having one or more of the features mentioned above and the essential parts of which form a permanently connected assembly although the checking portion of the device is normally concealed from inspection by the person being examined.

Other objects and features of the invention will become apparent from the following description which refers to the accompanying drawing, wherein.

Figure 5:
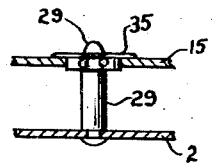
Figure 4:
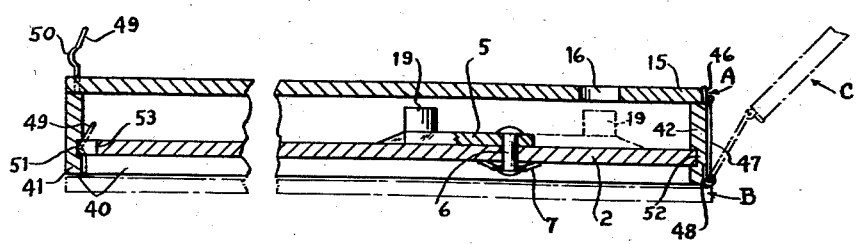

Fig. 4 is a transverse sectional view showing one manner in which the main elements of the device may be connected for guiding the scoring element from scoring into a normally concealed position, and Fig. 5 is a detail sectional view of one manner of assuring proper assembly of a scoring panel with the corresponding examining panel or test board when used in sets, the elements of which differ or do not correspond.

Figure 1:
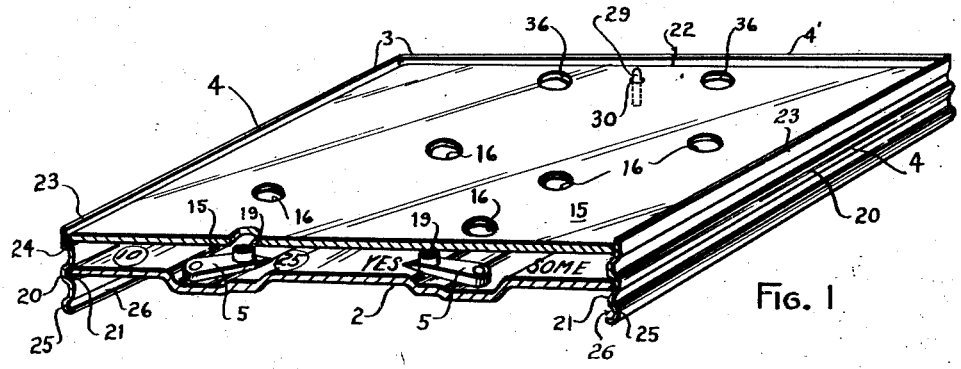
Fig. 1 is a sectional perspective view of one end portion of the device in one form.

The device in the form shown in Fig. 1 at 1 comprises a test board or panel 2 supported in a suitable hollow rectangular frame 3 having side walls 4 and end walls, one of which is shown at 4'. The test panel 2 has mounted thereon a set of movable indicator devices shown as indicator arms or pointers 5 adapted to be mounted in the manner shown for example by Fig. 4. The indicators may be otherwise movably arranged, e. g., slidably. The arm 5 in Fig. 4 is shown as carried on a pivot pin 6 in the form of a rivet passing through the panel 2 and provided at one end with spring friction means such as a slightly concave washer 7 slit radially at various places and bearing at one side against the associated head of the rivet and at the opposite side against the panel 2 so that the indicator when moved to a selected position by the person examined will stay in that position and not be displaced if the device is turned vertically or jogged.

Figure 2:
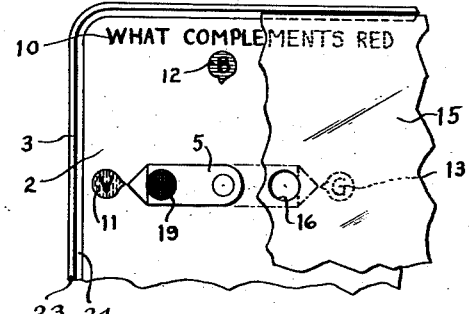
Fig. 2 is a fragmentary plan view showing the operation of an answer indicating unit and a corresponding part of the scoring unit.

Associated with the indicators, as shown for example by Fig. 2, are questions such as that indicated at 10, there being one such question for each indicator 5. Additionally, there are marked on the panel 2 two or more possible answer positions for the indicator. In the arrangement according to Fig. 2, the person examined moves the indicator 5 in an arc to one of the three answer positions indicated respectively at 11, 12 and 13. The answer position indications may be symbols of any sort made as simple as possible viz: "yes," "no," "some," "many," etc., or numerals in cases of questions involving mathematical calculations.

In the specific example shown by Fig. 2 the correct answer position is that indicated by dotted lines at 13. Each group of questions and respective optional answers has one correct or desired answer position for each associated indicator. When the person examined has set the indicators to what he thinks is the correct or desired answer position of each, the scoring is done by the instructor or examiner simply by applying over the set indicators a panel, such as partially shown at 15, Fig. 1 and Fig. 2. The scoring panel has a plurality of window forming holes therethrough as at 16, Fig. 1, one only for each indicator. All of the holes, if the indicators have been set to indicate correct or desired answers, will be in registration with underlying end portions of the indicators. Such end portions may carry, as shown by Figs. 1 and 2, adjusting knobs or buttons 19 having their top faces colored to contrast with the color of the scoring panel 15. Thus in order to effect scoring the attendant, instructor, or examiner merely places the scoring panel 15 in proper position on the frame 3 whereby the incorrect answers will be denoted by absence of such contrasting color at certain of the windows 16. The knobs or buttons 19 could be omitted and the entire top surface of each indicator or the end portion thereof provided with the desired contrasting color in position to align with the corresponding opening 16.

In the construction of the device shown by Fig. 1 the side and end walls 4 are constituted by a rolled or pressed strip of sheet material such as metal having a central rib 20 extending at least on opposite sides or ends for receiving and supporting adjacent edge portions of the panel 2 as in channels 21 formed as the inside surfaces of the ribs. The walls if made from rolled strip would usually have the same cross sectional shape all around the framework and matching or overlapped ends of the strip can be readily joined as by solder or welding as at 22 to hold the test panel 2 permanently in place. The top edges of the strip in the particular form shown are flanged as at 23 to form a ledged recess at 24 in which the scoring panel 15 rests when in proper scoring position. The upwardly facing or ledge surface portions of the ledged recess 24 support the scoring panel 15 substantially parallel to the testing panel 2 close to the tops of the indicator buttons 19 so that the colored surfaces thereof are readily visible through the windows; and the vertical surfaces of the ledge recess act in relation to edge surfaces of the scoring panel to center the latter in operative registration with the test panel.

To enable the scoring panel 15 to be stored in the frame in a position normally concealed from the subject being tested the bottom edges of the side walls 4 may have ribs such as shown at 25 forming guideway channels at 26. The channels are open at one end of the frame (not illustrated) in order slidably to receive the panel 15. Suitable spring detent means, not shown, may be provided to hold the scoring panel in place against accidental removal.

Figure 3:
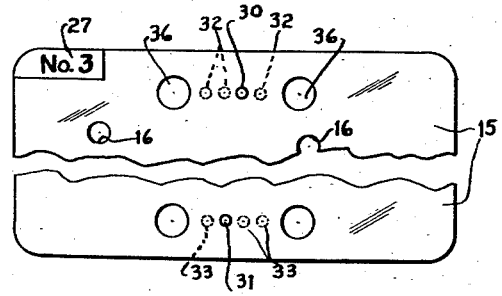
Fig. 3 is a fragmentary plan view showing two end portions of a checking or scoring panel used with the form of device shown by Fig. 1.

The panel 15 when separated from the particular set of questions and answers represented by the indicators and symbols on the corresponding panel 2 may be identified with that set either by corresponding marks such as partially suggested at 27 in Fig. 3 or in some other suitable manner. For further example the test panel 2 or its frame, may be provided, as at each end, with a pin 29 adapted to register with and enter holes in the scoring panel 15 such as indicated at 30 and 31 (Fig. 3 only) when the proper scoring panel has been applied. The positions of the pins would, for example, be different on corresponding members of the different sets so that in each set the pins 29 register with the two holes provided for them as at 30 and 31. If an attempt were to be made to apply a non-corresponding scoring panel to a test board having the pins 29 positioned as at one of the locations diagrammatically indicated at 32 and 33, Fig. 3, the pins would not enter the holes and the scoring panel could not be set down into its proper seated position on the ledge recess 24. The relative positions of pins and holes are thus adapted to be arranged in different order so that a large number of test boards and scoring panels can be made up in pairs the corresponding elements only of which will fit together or be properly associated for scoring.

If desired, in order to hold the scoring panel in place over the test board for handling or other purposes, each of the pins 29 may be made to constitute male elements of a snap fastener. A female element of such fastener is indicated at 35, Fig. 5, mounted on the scoring panel 15. Suitable means for enabling the scoring panel 15 to be picked up readily from its scoring position without having to tilt the frame may comprise paired finger and thumb receiving holes as at 36, Figs. 1 and 3, or any other suitable handle effect, preferably one that will occupy very little space transverse to the top face of the scoring panel.

If in using the device according to Figs. 1 and 3 it is desired completely to conceal the scoring panel from the person examined, then the panels 15 may either be stored separately from the test board or concealed on the underside of the test board as in the receiving guides 26. In event more adequate concealment is desired than afforded by the lower mounted position of the scoring panel on the frame, the bottom of the frame may have a bridging wall below the guideway 26 such as will conceal the positions of the windows 16 in case the person examined turns the device over to inspect it during examination or prior thereto.

If it is desired permanently to attach the scoring panel to the test board or its frame a suitable hinge arrangement is employed so that the scoring panel may be simply swung to normally concealed position at the rear or underside of the test board. Fig. 4 shows an appropriate arrangement for this purpose. The examining device 1 as shown in Fig. 4 comprises a main hollow frame 40, wooden for example, having wall portions such as exemplified by the side walls 41 and 42. The scoring panel 15 is swingably mounted on the frame 40 in such manner that its marginal edges register with corresponding walls of the frame 40 whereby operative registration of the windows of the scoring panel and properly set indicator knobs 19 are secured in the scoring position of the scoring panel. Such registration is maintained in the scoring position of the scoring panel shown at A and also in the concealing or storing position, shown in broken lines at B, by a hinge device which may be simply the conventional double hinge arrangement having articulated members 46, 47 and 48, the extreme two of which are attached respectively to the scoring panel and the frame 40. The manner in which the double hinge arrangement enables swinging, guided movement of the scoring panel from its scoring position A into the position B is shown partially diagrammatically at C (intermediate position).

To hold the scoring panel in its concealed position, one of the edges of said panel remote from the hinge may carry a spring clasp as at 49 having a cam detent portion 50 adapted to seat in a suitable depression on the inside surface of the wall 41. The detent 50 may for example seat in a registering portion of a groove 51 of the frame 40 which is one of a connected series of grooves, another being shown at 52, for receiving the panel 2. The panel is cut away locally as at 53 to receive the releasing arm of the clasp 49.

In each of the illustrated forms the scoring panel may have translucent or transparent means closing the window openings 16 (e. g., transparent cover sheet attached as by adhesive) in order to exclude foreign matter whereby the scoring panel may be used as a more complete protective cover for the indicators 5 and associated questions and answer indicating position marks. Such an arrangement would apply particularly where the scoring panel is adapted to be temporarily fastened in the scoring position as by such or spring fasteners, as 9 shown in Fig. 5.

It should be mentioned that there may be sets of indicators for each question, that is to say a separate indicator for each possible answer instead of the single indicator 5 shown. In that event one indicator only of each set would be moved by the person examined so as to be in registration or non-registration with the scoring opening of that set. The remainder of the set would remain out of registering position.

I claim:

1. An examining device comprising a hollow frame, a panel mounted by the frame and parallel with the principal plane thereof, said panel having a plurality of movable indicators on one face adapted to be set into certain positions indicating for example correct and incorrect answers, a scoring panel having windows adapted to expose the indicators only when the latter are set into certain positions, a double hinge mechanism interconnecting the panels and guiding the scoring panel from a scoring position overlying the indicators into a substantially concealed position opposite said one face, and spring clasp mechanism operatively connecting the two panels consequent upon movement of the scoring panel fully into one of said positions.

2. An examining device comprising a question and answer panel having indicator devices movably mounted thereon and arranged to be selectively moved to answer-indicating positions respective to associated questions, and a specifically corresponding scoring panel adapted to be placed over the said question and answer panel and having windows registering with and exposing portions of the said indicators only when the corresponding members of a set are used together and the indicators of that set are moved into certain positions, and inter-engaging elements associated with the two panels of each set and preventing the scoring panel from being placed in a desired scoring position if the two panels are non-corresponding ones of the set, but enabling placement in such desired position if they correspond.

3. An examining device comprising a question and answer panel having indicator devices movably mounted thereon and arranged to be readily selectively moved to answer-indicating positions respective to associated questions, and a scoring panel adapted to be placed over the said question and answer panel and having windows registering with and exposing portions of the said indicators only when the latter are set into certain positions, and a common supporting means for the two panels including abutment means mechanically cooperating with portions of respective panels to insure operative registration of the panels when the scoring panel is placed over the question and answer panel in parallel relationship therewith and sufficiently close thereto clearly to expose said indicator portions to view.

4. An examining device of the class described comprising a hollow frame, a substantially rigid panel carried by the frame intermediate of the front and rear edges of the frame walls and substantially parallel with the principal plane thereof, said panel having questionnaire matter thereon and associated therewith, a plurality of movable indicators on one face of the panel adapted to be set into certain positions indicating, for example, correct and incorrect answers in relation to the questionnaire matter, a substantially rigid scoring panel having windows so positioned thereon as to expose respective indicators only when the panels are in operative registration and the indicators are set into correct answer positions, said frame having supporting means for opposite marginal edge portions of the scoring panel in a plane substantially parallel to but spaced from the first mentioned panel a short distance such that the properly positioned indicators will be clearly visible through the windows of the scoring panel, and means associated with the supporting means and cooperating with the scoring panel to maintain the two panels in operative registration.

SAMUEL A. PECK.

REFERENCES CITED

The following references are of record in the file of this patent:

UNITED STATES PATENTS

| Number | Name | Date |
| --- | --- | --- |
| 279,457 | Stuckle | June 12, 1883 |
| 389,415 | Smith | Sept. 11, 1888 |
| 646,026 | Hertzer | Mar. 27, 1900 |
| 859,210 | Dixon | July 9, 1907 |
| 1,253,908 | Thompson | Jan. 15, 1918 |
| 1,396,379 | Moore | Nov. 8, 1921 |
| 1,586,628 | Dauterbach | June 1, 1926 |
| 1,797,744 | Wiley | Mar. 24, 1931 |
| 1,842,470 | Brownlee | Jan. 26, 1932 |
| 1,881,242 | Prentice | Oct. 4, 1932 |
| 1,946,385 | Bryant | Feb. 6, 1934 |
| 2,060,308 | Harding | Nov. 10, 1936 |
| 2,080,150 | Peterson | May 11, 1937 |